(12) United States Patent
Yang

(10) Patent No.: US 7,588,263 B2
(45) Date of Patent: Sep. 15, 2009

(54) ADJUSTABLE MESH BASKET FOR STROLLER

(75) Inventor: Cheng-Fan Yang, Tainan Hsien (TW)

(73) Assignee: Link Treasure Limited, Tortola (VG)

( * ) Notice: Subject to any disclaimer, the term of this patent is extended or adjusted under 35 U.S.C. 154(b) by 187 days.

(21) Appl. No.: 11/723,114

(22) Filed: Mar. 16, 2007

(65) Prior Publication Data

US 2007/0216138 A1  Sep. 20, 2007

(30) Foreign Application Priority Data

Mar. 16, 2006 (TW) .............................. 95204336 U

(51) Int. Cl.
*B62B 1/00* (2006.01)
(52) U.S. Cl. .................... 280/642; 280/650; 280/47.38; 224/409; 224/411
(58) Field of Classification Search ................ 280/642, 280/650, 652, 647, 644, 658, 47.38, 47.4, 280/47.35, 33.994; 403/106, 96; 224/409, 224/411
See application file for complete search history.

(56) References Cited

U.S. PATENT DOCUMENTS

| | | | | | |
|---|---|---|---|---|---|
| 4,923,208 | A | * | 5/1990 | Takahashi et al. | 280/642 |
| 5,370,408 | A | * | 12/1994 | Eagan | 280/33.994 |
| 5,741,021 | A | * | 4/1998 | Saint et al. | 280/47.38 |
| 6,062,589 | A | * | 5/2000 | Cheng | 280/647 |
| 6,267,406 | B1 | * | 7/2001 | Huang | 280/647 |
| 6,979,017 | B2 | * | 12/2005 | Chen | 280/642 |
| 7,011,318 | B2 | * | 3/2006 | Chen | 280/47.38 |
| 7,290,786 | B2 | * | 11/2007 | Cheng et al. | 280/647 |
| 7,445,229 | B2 | * | 11/2008 | Dotsey et al. | 280/642 |

* cited by examiner

*Primary Examiner*—Hau V Phan
(74) *Attorney, Agent, or Firm*—Muncy, Geissler, Olds & Lowe, PLLC

(57) ABSTRACT

A carrier basket has a bracket body, a pair of front basket-holding rods, a pair of positioning elements, and a rear basket-holding rod. The pair of front basket-holding rods is connected to both sides of the stroller frame, respectively. Each of the pair of positioning elements has a connecting portion for connecting with rear end of the front basket-holding rods, a pivotal portion for connecting with the rear basket-holding rod, and a pair of snap edges for holding the rear basket-holding rod in a first position. When the rear basket-holding rod is rotated in a direction against the snap edges, the snap edges can be pressed to open wider, thereby releasing the rear basket-holding rod from the first position and opening the rear end of the bracket.

10 Claims, 4 Drawing Sheets

ADJUSTABLE MESH BASKET FOR STROLLER

BACKGROUND OF THE INVENTION

1. Field of the Invention

The present invention relates to a bracket of a baby stroller and in particular, to a bracket with a positioning element for controlling a basket-holding rod which is adjustable in angle to open the rear end for convenience in use.

2. Description of the Related Art

Generally, a stroller for taking a baby outdoors for a walk or shopping is provided with a carrier basket placed under a seat to contain baggage and various necessities.

For a stroller with the carrier basket, the basket is usually installed on the under rear of the frame (the space of the under rear of the seat close to the user); thereby the user can push the stroller moving, with ease while putting the purchased matters into the carrier basket in the same time.

Since only a limited space is available for placing a carrier basket under the seat, a carrier basket having only a limited capacity can be placed under the seat. Conventional carrier basket is formed of only a flexible sewn material. This type of basket is extended rearward so that its opening is positioned behind a backrest of the seat, and the open end of the carrier basket is closed by pulling a drawstring.

The drawstring needs to be pulled to close the carrier basket and to be loosened to open the carrier basket, which makes it inconvenient for a user in terms of putting things in and taking things out of the carrier basket. Meanwhile, when the backrest of the stroller is laid down, it is difficult to open the carrier basket before user having a hand to adjust the backrest to rotate upwardly.

SUMMARY OF THE INVENTION

An object of the present invention is to provide a carrier basket in which the rear end can be either opened or closed by bending a rear basket-holding rod to rotate directly by hand.

The carrier basket according to the present invention has a bracket body, a pair of front basket-holding rods, a pair of positioning elements, a rear basket-holding rod. The bracket body may be made of fabric, mesh, soft cloth, mesh or the like. The pair of front basket-holding rods are connected to both sides of the stroller frame respectively. Each of the pair of positioning elements has a connecting portion for connecting with one end of the front basket-holding rods, a pivotal portion for connecting with the rear basket-holding rod, and a pair of snap edges for holding the rear basket-holding rod in a first position. When the rear basket-holding rod is rotated in the direction against the snap edges, the snap edges can be pressed to open, thereby to release the rear basket-holding rod from the first position and open the rear end of the bracket.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENTS

Figure 1:
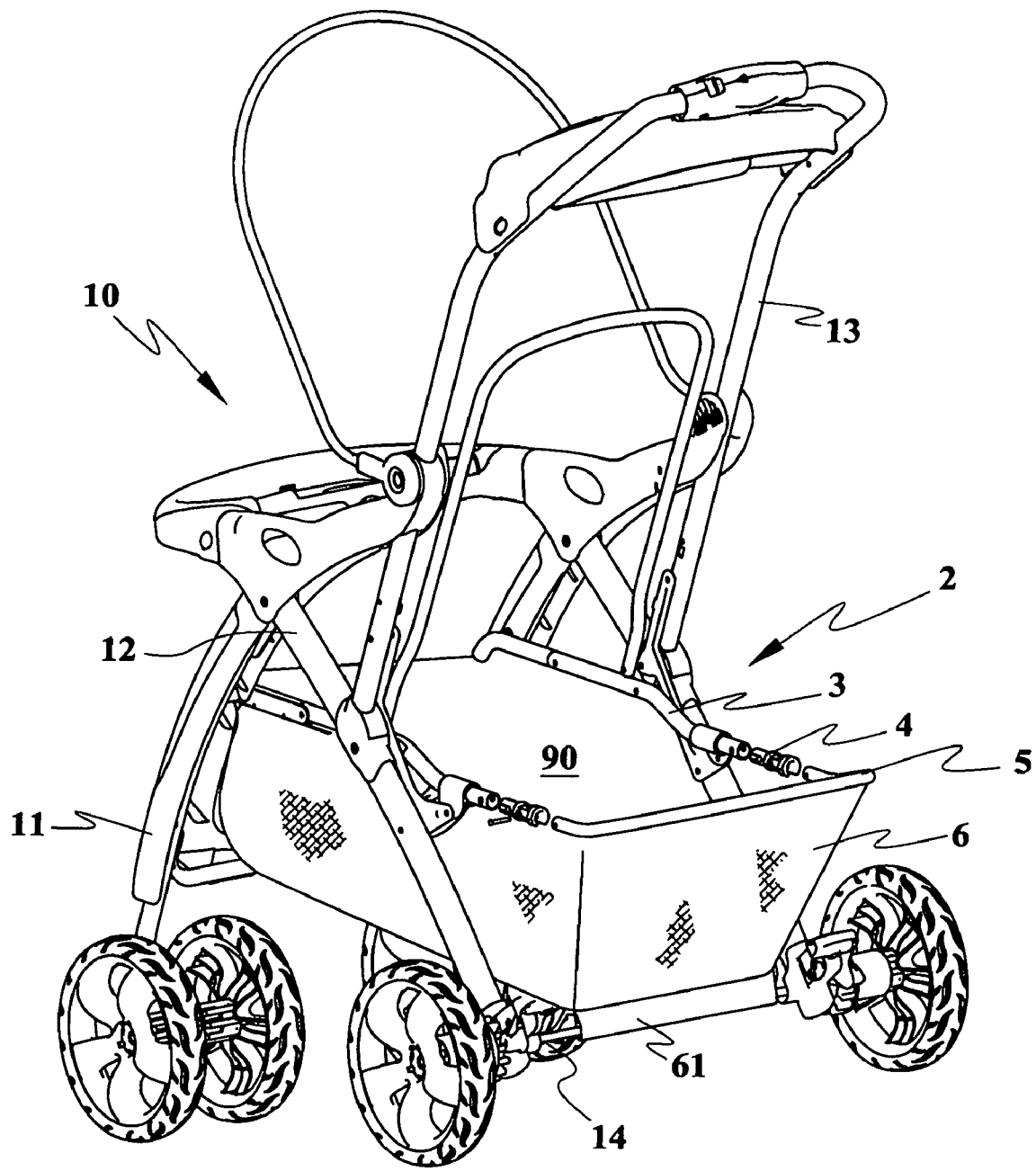
FIG. 1 is a rear left end perspective view of a stroller frame with a bracket according to the present invention.

Referring to FIG. 1, an embodiment of a bracket 2 is connected to a stroller frame 10. The stroller frame 10 has a handle bar 13, a pair of front leg tube 11 and rear leg tube 12. The rear leg tube 12 is pivotally connected with the front leg tube 11, and the end portion of the handle bars 13 is pivotally connected to the middle portion of the rear leg tube 12. A rear wheel axle 14 is transversely connected between the lower end of the rear leg tubes 12.

The bracket 2 as shown in FIG. 1, comprises a bracket body 6, a pair of front basket-holding rods 3, a pair of positioning elements 4, a rear basket-holding rod 5. The bracket body 6 may be made of fabric, mesh, soft cloth, or the like, and is formed with a storage room 90 and a rotatable rear end which is carried and followed by the rotation of the rear basket-holding rod 5 in either direction to open or close the storage room 90. Preferably, the bracket body 6 is formed with a sleeve 61 at the lower rear edge to encircle the rear wheel axle 14, thereby to hold the bracket 2 and limit unexpected wobbling during the stroller is pushed by user to move on a bumpy ground.

Figure 2:
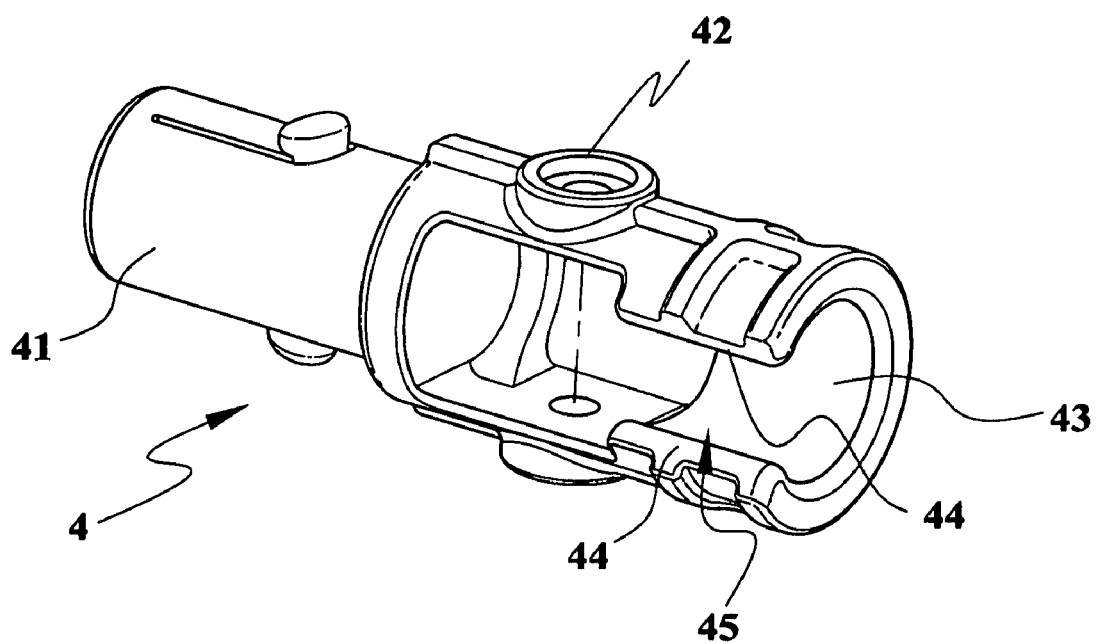
FIG. 2 is a schematic view showing an embodiment of the positioning element of the present invention.
Figure 3:
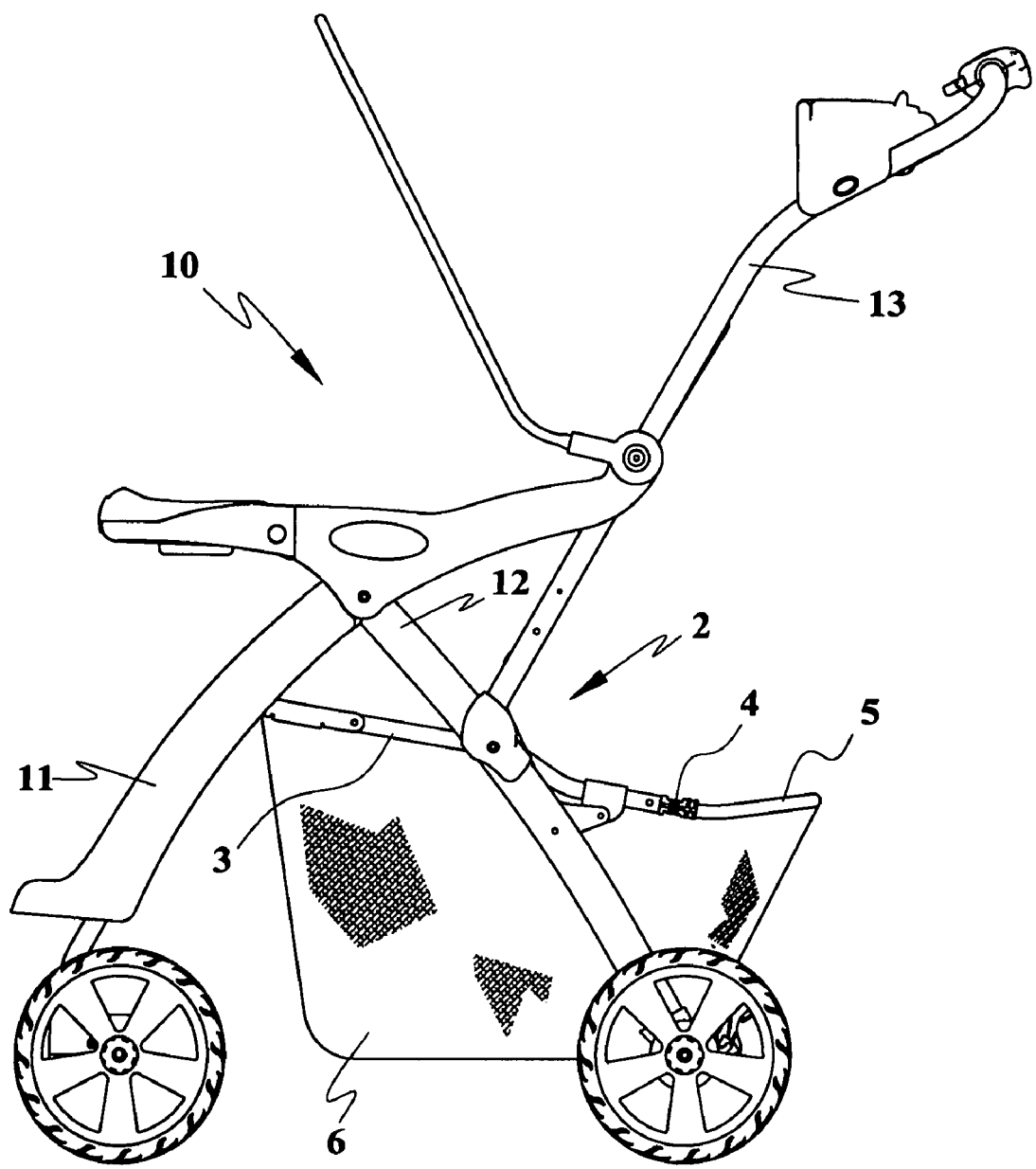
FIG. 3 is a schematic side view showing the rear end of the bracket is closed when the rear basket-holding rod is kept in a first position.

Referring to FIGS. 1 to 3, the pair of front basket-holding rods 3 are connected to both sides of the stroller frame 10 respectively. Each of the pair of positioning elements 4 has a connecting portion 41 for connecting with rear end of the front basket-holding rods 3, a pivotal portion 42 for pivotably connecting with the rear basket-holding rod 5, and a pair of snap edges 44 which is formed with a snap notch 45 for holding the rear basket-holding rod 5 in a first position 43.

The pair of snap edges 44 can be a resilient clasp connected to the positioning elements 4. However, the pair of snap edges 44 can also be made of plastic and is formed integrally with the other portion of the whole positioning element 4. The snap notch 45 of the present embodiment 4 is small than the diameter of the rear basket-holding rod 5, thereby to hold the rear basket-holding rod 5 in the first position 43 as shown in FIG. 3.

Figure 4:
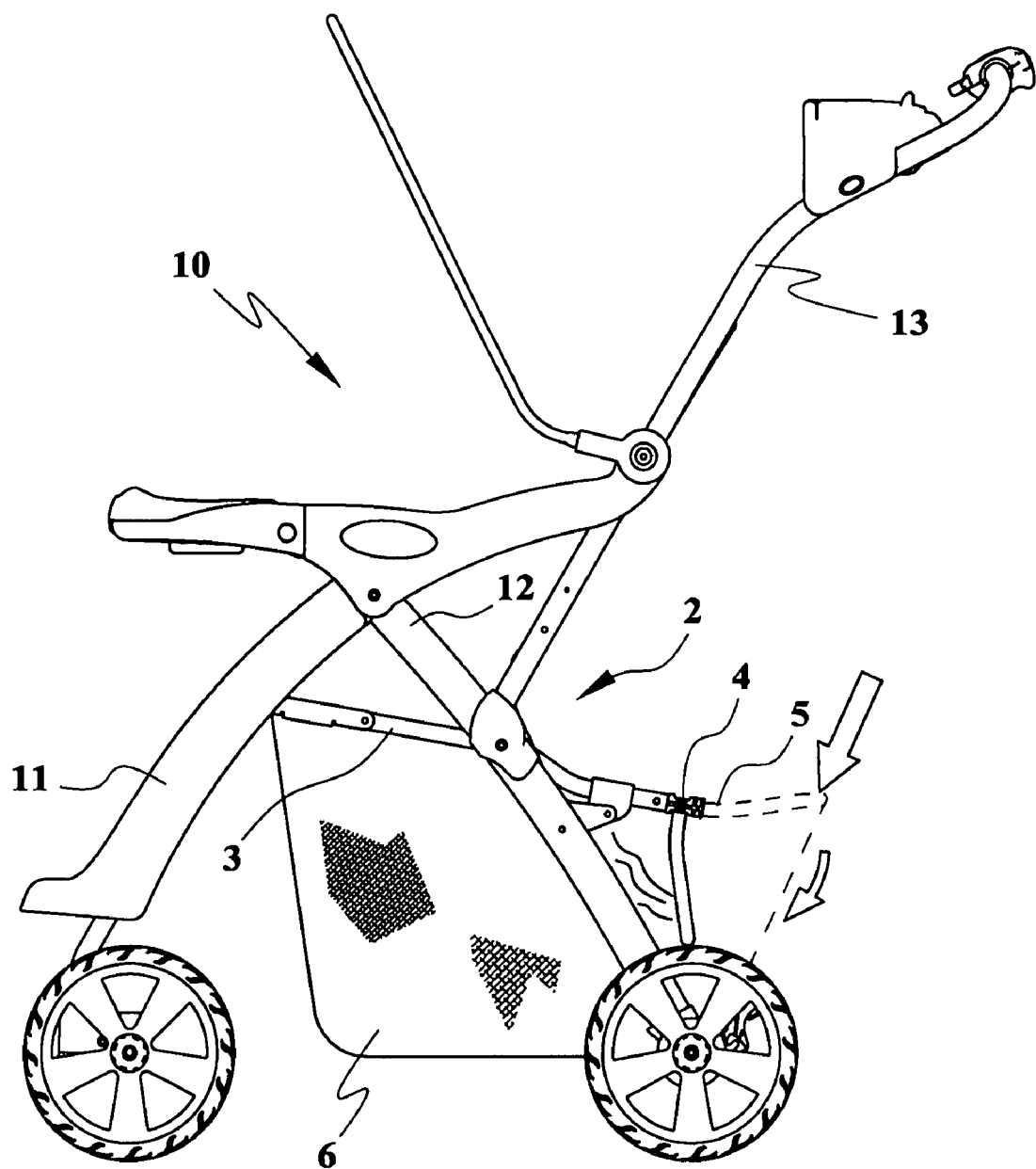
FIG. 4 is a schematic side view showing the rear end of the bracket is opened when the rear basket-holding rod is released from the first position and rotated downwardly.

Referring to FIG. 4 when the rear basket-holding rod 5 is rotated in a direction thereby to press against the snap edges 44, the snap edges can be pressed to open the snap notch 45 be more wider, thereby to allow the rear basket-holding rod 5 release from the snap notch 45, to open the rear end of the bracket 2.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An adjustable basket of a stroller, comprising:
a bracket body, having a rear end and a storage room;
a pair of front basket-holding rods connected with the stroller for holding the bracket body;
a pair of positioning elements, each of the positioning elements having a pivotal portion a snap edge, and a connecting element for respectively connecting with the pair of front basket-holding rods; and
a rear basket-holding rod, having two ends pivotably connected on the pivotal portion of the pair of positioning elements, respectively, which can be held by the snap edges in a first position and rotated to force the snap edges to open wider and release from the first positions,
wherein the snap edges are formed with a snap notch having a diameter smaller than the diameter of the rear basket-holding rod, so as to hold the rear basket-holding rod in the first position.

2. The adjustable basket of claim 1, wherein the snap edges are integrally formed with the positioning elements.

3. The adjustable basket of claim 1, wherein the snap edges are pressed to open wider and allow the rear basket-holding rod to leave the first position, thereby opening the rear end of the bracket body.

4. The adjustable basket of claim 1, wherein the bracket body is made of a fabric and has a rotatable rear end which is carried by the rear basket-holding rod.

5. The adjustable basket of claim 1, wherein the bracket body is made of a mesh or a soft cloth, and has a rotatable rear end which is carried by the rear basket-holding rod.

6. An adjustable basket of stroller comprising:
a bracket body, having a rear end and a storage room;
a pair of front basket-holding rods connected with the stroller for holding the bracket body;
a pair of positioning elements, each of the positioning elements having a pivotal portion a snap edge, and a connecting element for respectively connecting with the pair of front basket-holding rods; and
a rear basket-holding rod, having two ends pivotably connected on the pivotal portion of the pair of positioning elements, respectively, which can be held by the snap edges in a first position and rotated to force the snap edges to open wider and release from the first position,
wherein the stroller has a pair of rear leg tubes and a rear wheel axle connected between the pair of rear leg tubes, for connecting with the bracket body, and
wherein the bracket body is made of a soft material and formed with a sleeve for encircling the rear wheel axle.

7. The adjustable basket of claim 6, wherein the snap edges are integrally formed with the positioning elements.

8. The adjustable basket of claim 6, wherein the snap edges are pressed to open wider and allow the rear basket-holding rod to leave the first position, thereby opening the rear end of the bracket body.

9. The adjustable basket of claim 6, wherein the bracket body is made of a fabric and has a rotatable rear end which is carried by the rear basket-holding rod.

10. The adjustable basket of claim 6, wherein the bracket body is made of a mesh or a soft cloth, and has a rotatable rear end which is carried by the rear basket-holding rod.

* * * * *